United States Patent
Dowski, Jr. et al.

(10) Patent No.: US 6,525,302 B2
(45) Date of Patent: Feb. 25, 2003

(54) WAVEFRONT CODING PHASE CONTRAST IMAGING SYSTEMS

(75) Inventors: Edward Raymond Dowski, Jr., Lafayette, CO (US); Carol Jean Cogswell, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 57 days.

(21) Appl. No.: 09/875,435

(22) Filed: Jun. 6, 2001

(65) Prior Publication Data

US 2002/0195538 A1 Dec. 26, 2002

(51) Int. Cl.[7] .................. G02B 27/40; G06K 9/36
(52) U.S. Cl. .................. 250/201.2; 356/124.5; 382/214; 382/255; 382/274; 382/276; 382/283; 382/232
(58) Field of Search .................. 250/201.2, 201.4; 356/124.5; 382/214, 255, 274, 276, 283, 232; 359/279

(56) References Cited

U.S. PATENT DOCUMENTS

| 5,751,475 A | * | 5/1998 | Ishiwata et al. ............. 359/371 |
| 6,011,874 A | * | 1/2000 | Gluckstad .................... 359/559 |
| 6,262,818 B1 | * | 7/2001 | Cuche et al. .................. 359/10 |

* cited by examiner

Primary Examiner—Evelyn A Lester
(74) Attorney, Agent, or Firm—Curtis A. Vock, Esq.

(57) ABSTRACT

The present invention provides extended depth of field or focus to conventional Phase Contrast imaging systems. This is accomplished by including a Wavefront Coding mask in the system to apply phase variations to the wavefront transmitted by the Phase Object being imaged. The phase variations induced by the Wavefront Coding mask code the wavefront and cause the optical transfer function to remain essentially constant within some range away from the in-focus position. This provides a coded image at the detector. Post processing decodes this coded image, resulting in an in-focus image over an increased depth of field.

22 Claims, 11 Drawing Sheets

Top row: 40X/1.3 Phase Contrast Imaging

Bottom row: 40X/1.3 Wavefront Coded Phase Contrast Imaging

Figure 11

WAVEFRONT CODING PHASE CONTRAST IMAGING SYSTEMS

CROSS-REFERENCE TO RELATED APPLICATIONS

U.S. Pat. No. 5,748,371, issued May 5, 1998 and entitled "Extended Depth of Field Optical Systems," is incorporated herein by reference. U.S. patent application Ser. No. 09/766,325, filed Jan. 19, 2001, is a related application, and is incorporated herein by reference.

BACKGROUND OF THE INVENTION

1. Field of the Invention

This invention relates to apparatus and methods for using Wavefront Coding to improve contrast imaging of objects which are transparent, reflective or vary in thickness or index of refraction.

2. Description of the Prior Art

Most imaging systems generate image contrast through variations in reflectance or absorption of the object being viewed. Objects that are transparent or reflective but have variations in index of refraction or thickness can be very difficult to image. These types of transparent or reflective objects can be considered "Phase Objects". Various techniques have been developed over the years to produce high contrast images from essentially transparent objects that have only variations in thickness or index of refraction. These techniques generally modify both the illumination optics and the imaging optics and are different modes of what can be called "Contrast Imaging".

There are a number of different Contrast Imaging techniques that have been developed over the years to image Phase Objects. These techniques can be grouped into three classes that are dependent on the type of modification made to the back focal plane of the imaging objective and the type of illumination method used. The simplest Contrast Imaging techniques modify the back focal plane of the imaging objective with an intensity or amplitude mask. Other techniques modify the back focal plane of the objective with phase masks. Still more techniques require the use of polarized illumination and polarization-sensitive beam splitters and shearing devices. In all of these Contrast Imaging techniques, modifications to the illumination system are matched to the modifications of the imaging optics.

Contrast Imaging techniques that require phase modification of the back focal plane of the imaging objectives we call "Phase Contrast" techniques. These techniques include traditional Phase Contrast as described by Zernike in 1958 (see Video Microscopy, Inoue and Spring, 1997, Plenum Press, NY), those including variations in amplitude and phase on the back focal plane of the objective (see, for example U.S. Pat. No. 5,969,853), variations incorporating spatial light modulators (see, for example, U.S. Pat. No. 5,751,475), and variations of Phase Contrast imaging requiring multiple images (see, for example, U.S. Pat. No. 5,969,855).

Figure 1:
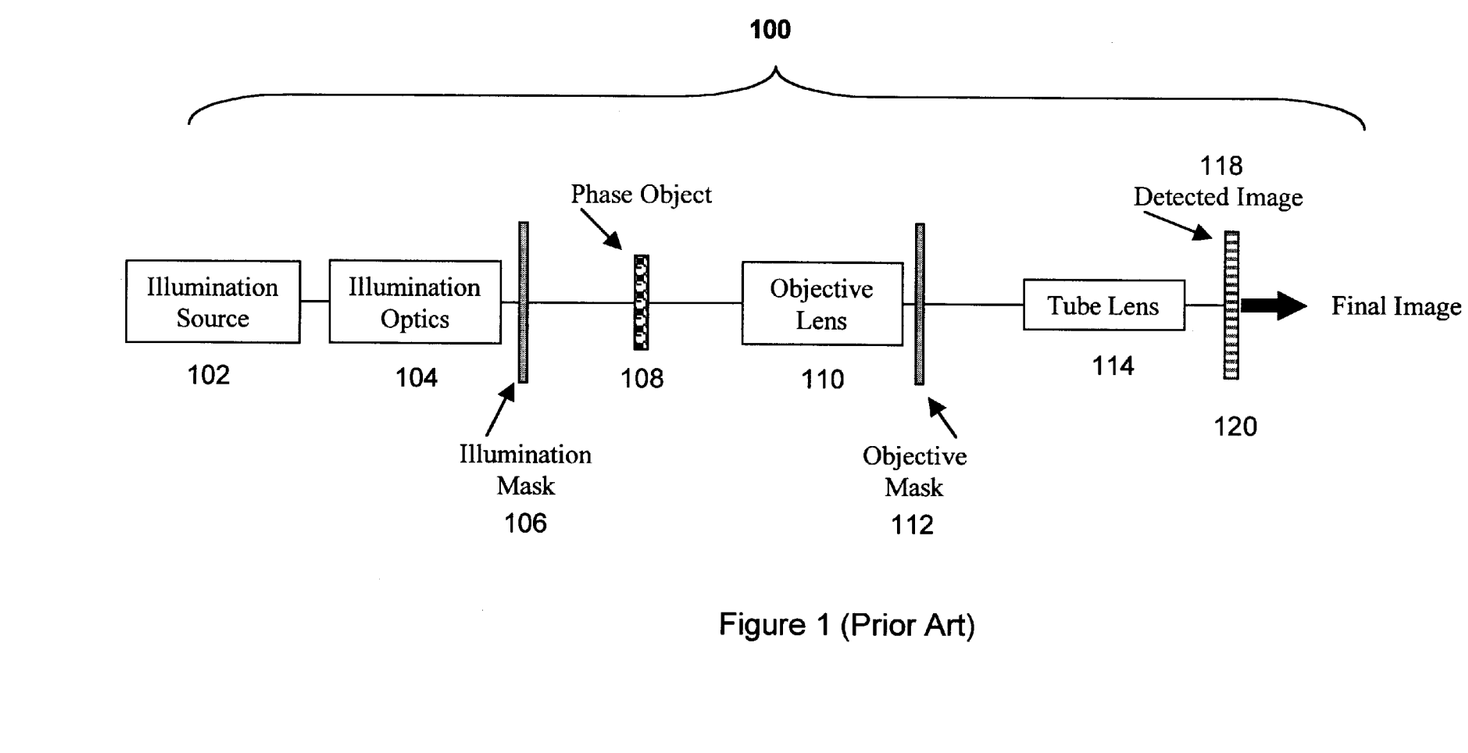
FIG. 1 (prior art) is a block diagram showing a conventional Phase Contrast Imaging system.

FIG. 1 (Prior Art) is a block diagram of a conventional Phase Contrast imaging system 100, which shows generally how Phase Contrast Imaging techniques are implemented. This figure illustrates imaging a phase object 108 through transmission, but those skilled in the art will appreciate that the elements could just as simply have been arranged to show imaging through reflection.

Illumination source 102 and illumination optics 104 act to produce focussed light upon Phase Object 108. A Phase Object is defined here as an object that is transparent or reflective and has variations in thickness and/or index of refraction. Obviously almost any real life object is, strictly speaking, a Phase Object, but only objects having enough thickness or index of refraction variation to be difficult to image will require special imaging techniques. A Phase Object can be difficult to image because the majority of images typically are formed from variations in the reflectance or absorption of the object.

Objective lens 110 and tube lens 114 act to produce an image 118 upon detector 120. Detector 120 can be film, a CCD detector array, a CMOS detector, etc. The Phase Contrast techniques are implemented by using illumination mask 106 and objective mask 112. Traditional imaging, such as bright field imaging, would result if neither an illumination mask nor an objective mask were used.

Figure 2:
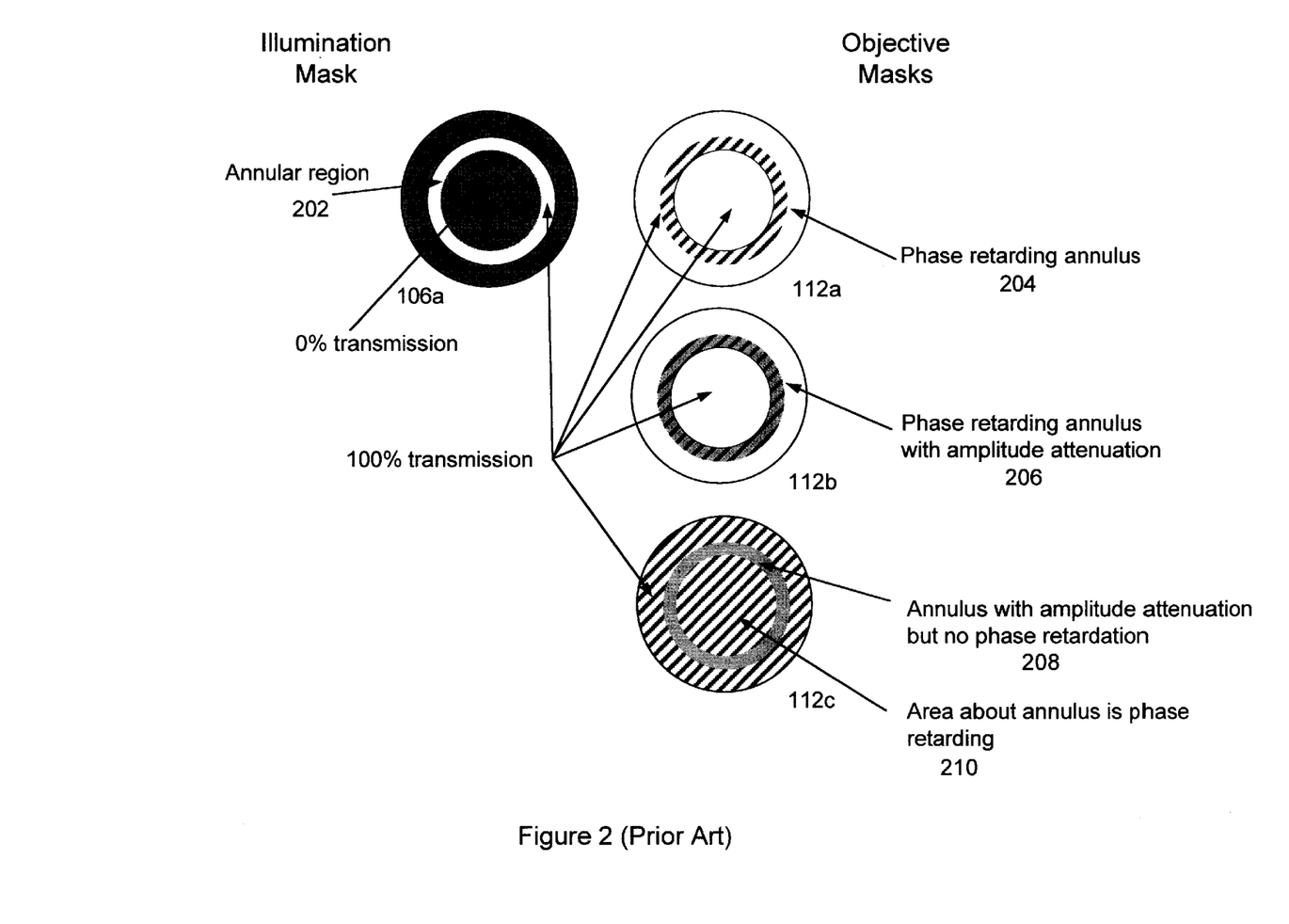
FIG. 2 (prior art) is a top view showing an illumination mask and several objective masks for use in the Phase Contrast Imaging system of FIG. 1.

FIG. 2 (Prior Art) shows a first embodiment of an illumination mask 106a and objective masks 112a, 112b, and 112c constructed and arranged for Phase Contrast Imaging. Illumination mask 106a consists of an annular region 202 of high transmittance and the remaining regions being low to zero transmittance.

Objectives masks 112a, 112b, and 112c have phase and transmittance variations essentially conjugate to the transmittance variations of the illumination mask 106a. With no specimen, the majority of the light from illumination mask 106a will traverse the annular regions (204, 206, or 208) of the objective masks. In objective mask 112a this annular region 204 contains a phase retarding material with the transmittance of each portion of the mask being 100%. In objective mask 112b the annular 206 region contains a phase retarding material as well as amplitude attenuation material. The remaining regions of objective mask 112b have 100% transmittance. In objective mask 112c the annular region 208 contains amplitude attenuation material but no phase retardation material. The remaining regions 210 of objective mask 112c contain phase retarding material and no amplitude attenuation material.

In operation, the light that travels through illumination annulus 202 that is not significantly diffracted by object 108 (as for example when a phase gradient is not present) traverses the conjugate annular regions 204, 206, or 208 of objective masks 112a, 112b, or 112c respectively. When using objective mask 112a this undeviated light is phase retarded. When using objective mask 112b the undeviated light is phase retarded and attenuated. When using objective mask 112c this light is only attenuated, but not phase retarded. The light that is diffracted or scattered by object 108 passes mainly through regions of the objective masks other than the annulus. In objective mask 112a the diffracted light is neither phase retarded nor attenuated. When combined with the undeviated light, brought into phase through the phase retardance at the annulus 204, constructive interference at the image results and the object appears lighter than the background image. In objective mask 112b the diffracted and undeviated light are also brought into phase due to the phase retardance of annulus 206, but the background image intensity is reduced by the amplitude attenuation of annulus 206. In objective mask 112c the diffractive light and the undeviated light are made to destructively interfere at the image so that the image of the Phase Object appears darker in the image than the background. The background is also reduced by the amplitude attenuation of annulus 208. In each of these variations, Phase Contrast imaging converts phase differences in the Phase Object into intensity differences in the formed images.

Figure 3:
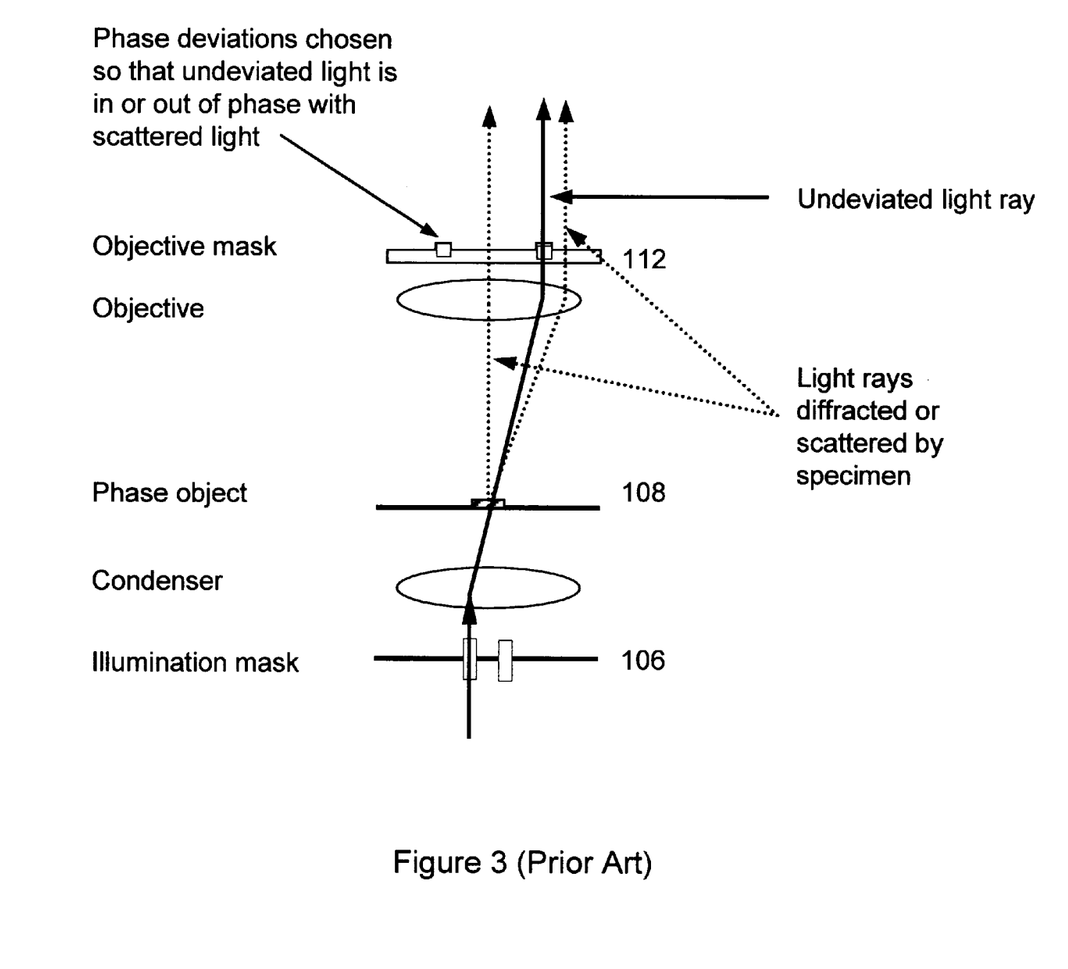
FIG. 3 (prior art) is a schematic diagram showing passage of undeviated and diffracted light in the Phase Contrast Imaging system of FIG. 1.

FIG. 3 (Prior Art) shows a traditional diagram explaining the operation of Phase Contrast imaging accomplished by a conventional imaging system such as 100, in FIG. 1 (Prior Art). See Video Microscopy, Inoue and Spring, Plenum Press, 1997, NY for other similar diagrams. The illumination mask such as 106 produces essentially a hollow cone of light from the condenser. Light that is not diffracted or scattered from the Phase Object passes through the conjugate regions of the objective mask such as the annulus on objective mask 112a. Light that is diffracted or scattered from the Phase Object does not pass through the phase retarding annulus of the objective mask. The diffracted light has been phase retarded by the Phase Object 108. Zernike showed that many Phase Objects can be modeled as imparting a pi/2 phase delay to the diffracted light. When the undeviated light is also delayed by an equivalent pi/2 phase both the diffracted and undeviated light arrive at the image plane in phase and constructively interfere to produce an image of the Phase Object lighter than the background. By changing the relative phases between the diffractive and undeviated light, as well as the relative intensity of the diffracted and/or undeviated light, the image of the Phase Objects can be lighter or darker than the background, and the background intensity can be raised or lowered.

A mathematical description of Phase Contrast imaging is as follows. Represent the incident light wave by sin(wt), where t denotes time and w denotes radian temporal frequency. Assume that illumination mask 106a and objective mask 112b of FIG. 2 are used. When the incident light does not pass through the specimen, this undeviated light intercepts the objective mask at the phase annulus and is phase retarded and attenuated. This light can be represented as:

$$S_o = a\ \sin(wt - \phi)$$

where $\phi$ is the amount of phase retardation at the annulus and a, 0<=a<=1, is the transmittance of the light at the annulus. The intensity of the image formed from this signal can be shown to be proportional to the time average of the square of $S_o$. This time average is given as:

$$<S_o^2> = a^2/2$$

When the incident light passes through the specimen, the light is delayed (and diffracted or scattered) and can then be represented as:

$$S_1 = \sin(wt - \delta),$$

where $\delta$ is the phase delay due to the Phase Object. The value of this phase delay is dependent on the size of the Phase Object, the local surface slope, and the change in index of refraction. It is this phase delay due to the Phase Object that is transferred to image intensity with Phase Contrast imaging. With the identity sin(a−b)=sin(a) cos(b)−cos(a) sin(b), $S_1$ can be written as:

$$S_1 = \sin(wt)\cos(\delta) - \cos(wt)\sin(\delta)$$

The first term of the specimen-diffracted light $S_1$ is identical to the undeviated light of $S_o$ with a weighting related to the amount of phase delay due to the Phase Object. This first term will then be modified at the objective mask 112b by being phase retarded and attenuated. The light after the objective is then described as $$S_1 = a\ \sin(wt-\phi)\cos(\delta) - \cos(wt)\sin(\delta)$$

Squaring $S_1$ yields:

$$S_1^2 = a^2 \cos(d)^2 \sin(wt-\phi)^2 + \sin(\delta)^2 \cos(wt)^2 - 2a\ \sin(\delta)\cos(\delta)\sin(wt-\phi)\cos(wt)$$

With the identity sin(a)cos(b)=[sin(a+b)+sin(a−b)]/2 this squared signal can be written as:

$$S_1^2 = a^2 \cos(\delta)^2 \sin(wt-\phi)^2 + \sin(\delta)^2 \cos(wt)^2 - a\ \sin(\delta)\cos(\delta)[\sin(2wt-\phi) - \sin(\phi)]$$

The time average of this squared signal can be shown to be given by:

$$<S_1^2> = [a^2 \cos(\delta)^2 + \sin(\delta)^2 + 2a\ \cos(\delta)\sin(\delta)\sin(\phi)]/2$$

For small phase delay $\delta$ due to the Phase Object, we can use the approximations that that cos($\delta$)~1, sin($\delta$)~$\delta$, and $\delta^2$~0, and can rewrite this time average as:

$$<S_1^2> \sim (a^2/2) + \delta\ \sin(\phi)$$

For no phase retardation at the annulus of the objective mask, $\phi$=0, the value of the time average reduces to (a²/2). This is the same as that of the time average of $S_o^2$ representing the light that is not deviated by the specimen. Or, as is well known, Phase Objects cannot be imaged with traditional techniques such as brightfield that do not compensate for phase in the undeviated and diffractive light. With Phase Contrast techniques, such as with $\phi$=pi/2 at the objective mask annulus, Phase Objects can be imaged clearly and distinctly from the background image.

Although Phase Contrast Imaging techniques effectively produce high contrast images of Phase Objects, these techniques do not allow a large depth of field or control of general focus-related aberrations. A large depth of field is important when imaging objects that have a depth that is large in relation to the depth of field of the system or when making a very low cost imaging system.

There is a need to improve Contrast Imaging of Phase Objects by increasing depth of field and controlling focus-related aberrations.

SUMMARY OF THE INVENTION

An object of the present invention is to improve Contrast Imaging of Phase Objects by increasing depth of field and controlling focus-related aberrations. This is accomplished by using Contrast Imaging apparatus and methods with Wavefront Coding aspheric optics and post processing to increase depth of field and reduce misfocus effects. Increasing depth of field is important when imaging Phase Objects with large depth. Controlling focus-related aberrations is important when making inexpensive Contrast Imaging systems.

Wavefront Coding can be used in conjunction with Phase Contrast imaging techniques to produce systems that have both a large depth of field and high contrast imaging of Phase Objects. The general Phase Contrast imaging system is modified with a special purpose optical element and image processing of the detected image to form the final image. Unlike the traditional Phase Contrast imaging system, the final image using Wavefront Coding is not directly available at the image plane. Post processing of the detected image is required. The Wavefront Coding optical element can be fabricated as a separate component, can be formed integrally with the objective mask, or can be constructed as an integral component of the imaging objective or tube lens, or any combination of such.

A Wavefront Coding optical element can also be used on the illumination side of the system in order to extended the depth of field of the projected illumination due to the duality of projection and imaging. This projected illumination would be broader than without Wavefront Coding, but the optical density as a function of distance from the object would be less sensitive with Wavefront Coding than without. Without Wavefront Coding on the illumination side of the system, the object can technically be imaged clearly but is not illuminated sufficiently. See "Principal of Equivalence between Scanning and Conventional Optical Imaging Systems", Dorian Kermisch, J. Opt. Soc. Am., Vol. 67, no. 10, pp.1357–1360 (1977).

The main component of importance for the Wavefront Coding imaging optics and digital processing in Phase Contrast systems is the objective mask, as opposed to the illumination mask. Without the objective mask, the imaging side of the system (as opposed to the illumination side) is very similar to a traditional imaging system used for imaging non-Phase Objects. The illumination mask can be considered as only required to alter the illumination light of the given object being imaged. Since many combinations of illumination configuration and object can produce the same transmitted (or reflected) wavefront, we can consider the use of specialized illumination as a means of altering the object's imaging characteristics when the object itself cannot be altered. The illuminated object is imaged through optics that have been modified to enhance the type of wavefront that the specialized illumination system is providing. Only changes in the objective mask necessitate changes in the optics or processing with Wavefront Coding.

DETAILED DESCRIPTION OF THE PREFERRED EMBODIMENTS

Figure 4:
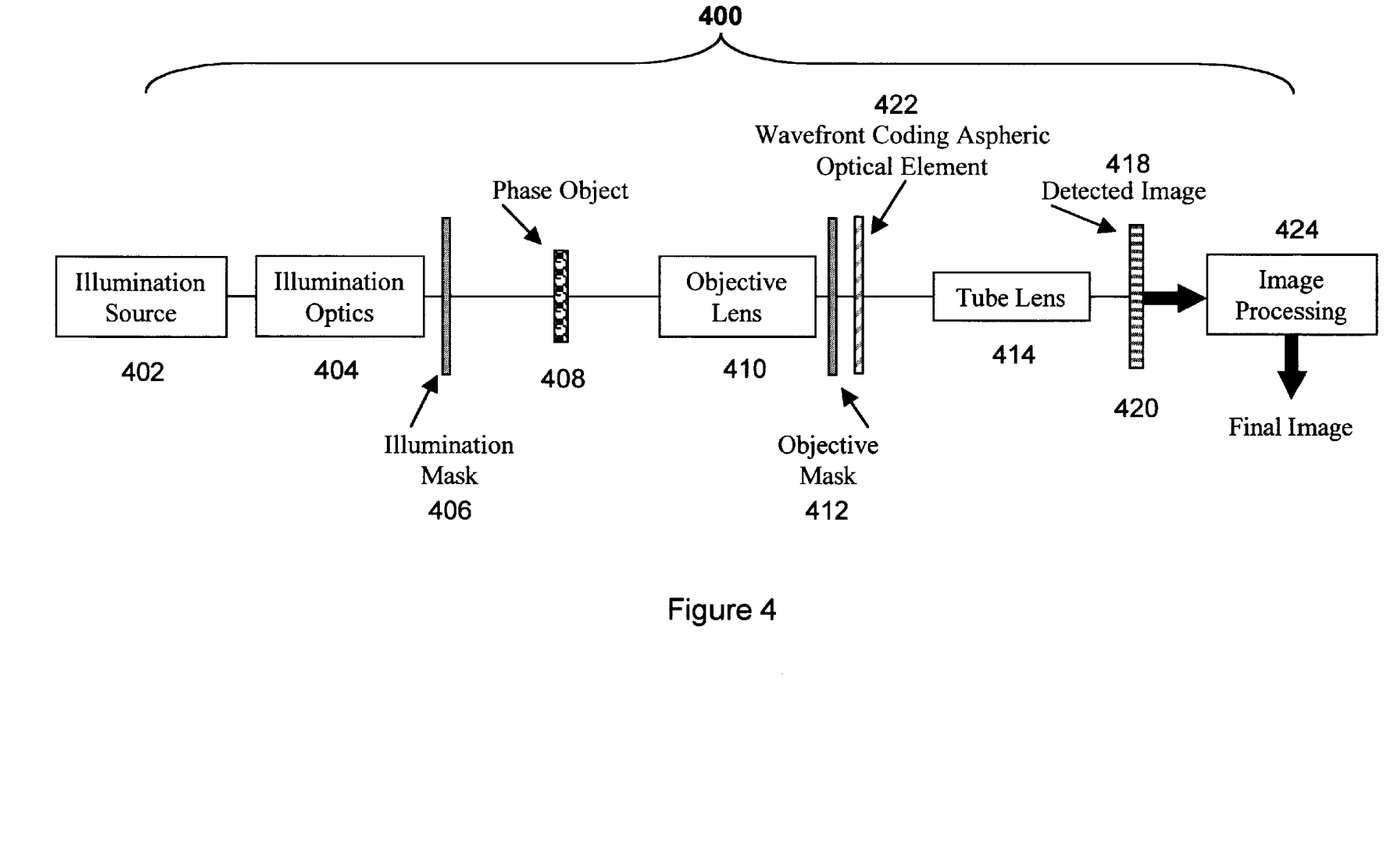
FIG. 4 shows a Wavefront Coding Phase Contrast imaging system including Wavefront Coding and post processing in accordance with the present invention.

Wavefront Coding can be integrated with traditional objectives and objective masks in Phase Contrast systems, as shown in FIG. 4, to achieve an increased depth of field in an optical and digital imaging system that also images Phase Objects 108. This is illustrated through inspection of the ambiguity functions and modulation transfer functions (MTFs) of the related traditional, Phase Contrast systems, and Wavefront Coded Phase Contrast imaging systems, as shown in FIGS. 5–10. FIG. 11 shows real-world images taken with a Phase Contrast Imaging system of FIG. 1 and comparison images taken by the Wavefront Coding Phase Contrast system of FIG. 4.

FIG. 4 shows a Wavefront Coding Phase Contrast Imaging system 400 including specialized aspheric optics and post processing in accordance with the present invention. The general Phase Contrast imaging system of FIG. 1 is modified with a special purpose generalized aspheric optical element 422 and image processing 424 of the detected image to form the final image. Unlike the traditional imaging system, the final image in the Wavefront Coded system 400 is not directly available at image plane 418. In fact, no sharp and clear image of any kind is available in system 400 at image plane 418. Post processing 424 of the detected image is required, to remove the Wavefront Coding effects (other than the extended depth of field).

Wavefront Coding optical element 422 can be fabricated as a separate component as shown in FIG. 4, can be formed integrally with objective mask 412, or can be constructed as an integral component of imaging objective 410 or tube lens 414. Any material or configuration that can impart a range of spatial phase shifts to a wavefront can be used to construct Wavefront Coding element 422. For example, optical glass or plastic of varying thickness and/or index of refraction can be used. Holograms, mirrors, and diffractive optical elements can also be used as the material for the Wavefront Coding element. In order to dynamically adjust the amount of depth of field, or to essentially change the Wavefront Coding element 422 for different objectives, spatial light modulators or micro-mechanical mirrors can also be used.

Similar reference numbers are used in FIG. 4 as are used in FIG. 1, since the systems are very similar, except for the addition of Wavefront Coding element 422 and post processing 424.

Wavefront Coding optical element 422 can also be used on the illumination side of system in order to extend the depth of field of the projected illumination due to the duality of projection and imaging. This projected illumination would be broader than without Wavefront Coding, but the optical density as a function of distance from the object would be less sensitive with Wavefront Coding than without.

The main component of importance in Wavefront Coding Phase Contrast systems 400 is objective mask 412, as opposed to illumination mask 406. Illumination mask 406 can be considered as mainly required to alter the transmitted (or reflected) light from object 408. Only changes in objective mask 412 necessitate changes in Wavefront Coding element 422 or Image Processing 424. For example, consider covering part of the area of illumination mask 106a so that no light can pass through part of the surface. With this change the objective mask is no longer matched to the illumination mask, but because of the theory of operation of Phase Contrast systems, Phase Objects will still be visible in the Phase Contrast and Wavefront Coded Phase Contrast images. Such a change in the illumination mask will not require a change to the imaging part of the system in order to view Phase Objects in the formed images. As another example, assume that the objective mask is changed, e.g. assume that one of the objective masks 112a, 112b, or 112c is substituted for another. These changes will not require a different illumination mask but could require changes in the Wavefront Coding optics and digital post processing.

Figure 5:
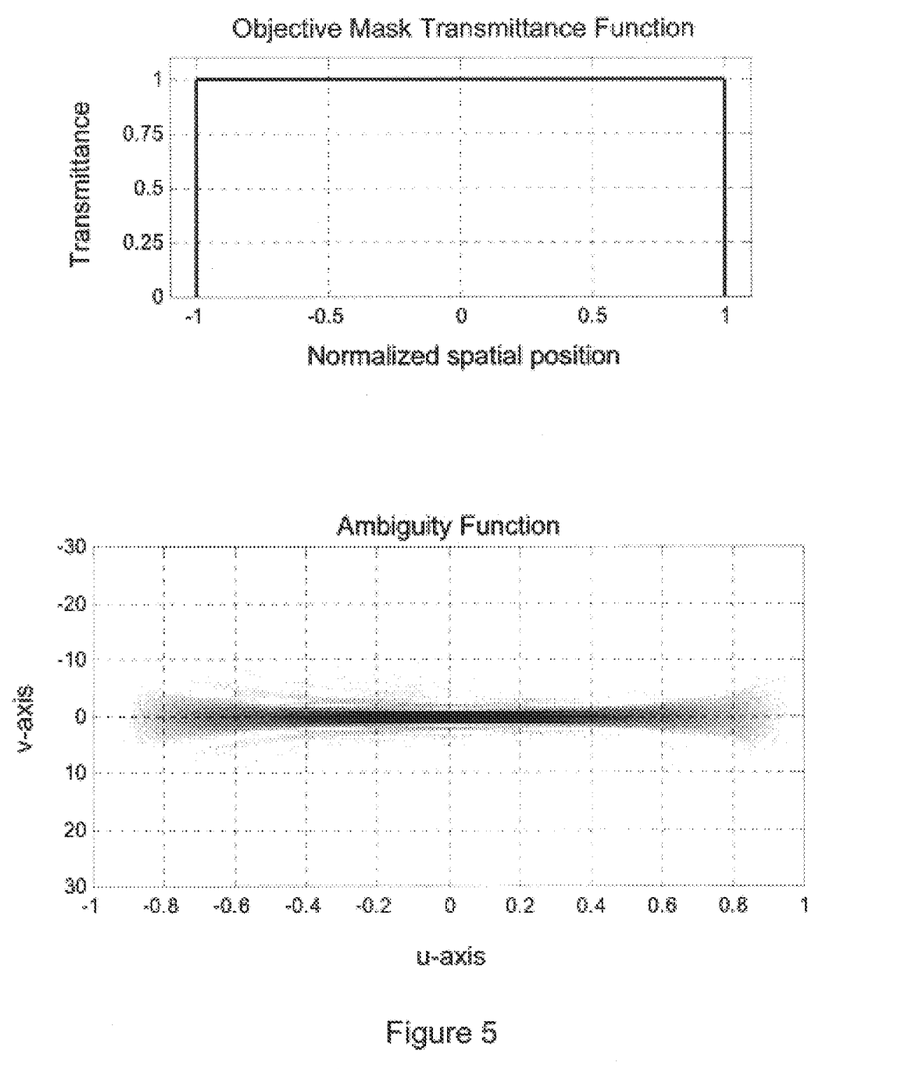
FIG. 5 includes plots showing the objective mask transmittance function and the corresponding ambiguity function for the Phase Contrast Imaging of FIG. 1, without the Phase Contrast components.

FIG. 5 shows the objective mask transmittance function and the corresponding ambiguity function for the prior art system of FIG. 1, without Phase Contrast modifications. Only the magnitude of the ambiguity functions in this and following figures are shown. Ambiguity functions are, in general, complex functions. One-dimensional systems are given for simplicity. Those skilled in the art of linear systems and ambiguity function analysis can quickly make extensions to two-dimensional systems. An ambiguity function representation of the optical system is a powerful tool that allows MTFs to be inspected for all values of misfocus at the same time. Essentially, the ambiguity function representation of a given optical system is similar to a polar plot of the MTF as a function of misfocus. The in-focus MTF is described by the trace along the horizontal v=0 axis of the ambiguity function. An MTF with normalized misfocus value of $\psi=[2\ pi\lambda W_{20}]$, where $W_{20}$ is the traditional misfocus aberration coefficient and $\lambda$ is the illumination center wavelength, is described in the ambiguity function along the radial line with slope equal to ($\psi$/pi). For more information on ambiguity function properties and their use in Wavefront Coding see "Extended Depth of Field Through Wavefront Coding", E. R. Dowski and W. T. Cathey, Applied Optics, vol. 34, no 11, pp. 1859–1866, April, 1995, and references contained therein.

Returning to FIG. 5, the top plot shows the objective mask transmittance function of a conventional system such as that shown in FIG. 1, without either an illumination mask 106 or an objective mask 112. In other words, FIG. 5 applies to a conventional imaging system without Phase Contrast modifications. The bottom plot shows the associated ambiguity function.

Over the normalized aperture (in normalized coordinates extending from −1 to +1) the ideal system has a transmittance of 1, i.e. 100%. The phase variation (not shown) is equal to zero over this range. The corresponding ambiguity function has concentrations of optical power (shown as dark shades) very close to the horizontal v=0 axis. From the relationship between the ambiguity function and misfocused MTFs, we see that the diffraction limited imaging system has a small depth of field because slight changes in misfocus lead to MTFs (represented by radial lines with non-zero slope in the ambiguity function) that intersect regions of small power (represented by lighter shades of gray or white regions).

Figure 6:
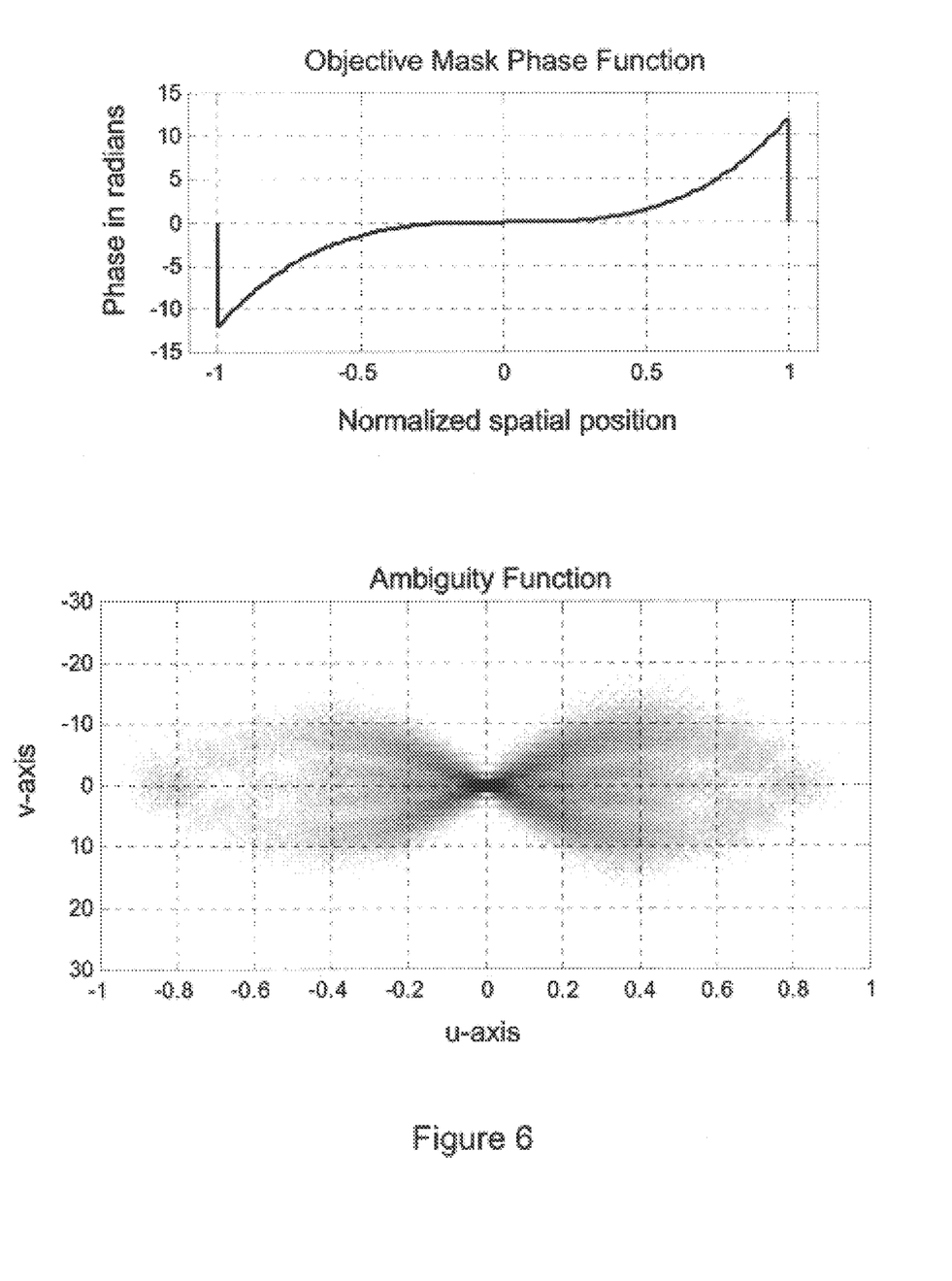
FIG. 6 includes plots showing the objective mask phase function and the corresponding ambiguity function for the Wavefront Coding Phase Contrast Imaging of FIG. 4, without the Phase Contrast components.

FIG. 6 shows a Wavefront Coding phase function and corresponding ambiguity function for an improved system of FIG. 4, but without illumination mask 406 or objective mask 412. Thus, this plot illustrates a system having Wavefront Coding, but not Phase Contrast Imaging. Modifying the ideal diffraction limited system associated with FIG. 5 with Wavefront Coding element 422 results in the plots of FIG. 6. As an example, a rectangularly separable complex phase function for this system is given as:

$$phase(x,y)=\exp(j12[x^3+y^3]),$$

$$|x|\leq 1, y\leq 1, j=\text{sqrt}(-1)$$

Increasing the peak-to-valley phase height (as can be done by increasing the constant 12 above) results in increasing depth of field. The transmittance of this system (not shown) is unity (i.e. 100%) over the entire aperture, as in the top plot of FIG. 5.

Other more general rectangularly separable forms of the Wavefront Coding complex phase are given by:

$$phase(x,y)=\exp(j^*[\Sigma a_i \text{sign}(x)|x|^{b_i}+c_i \text{sign}(y)|y|^{d_i}])$$

where the sum is over the index i. Sign(x)=−1 for x<0, +1 for x≥0.

Rectangularly separable forms of Wavefront Coding allow fast processing. Other forms of Wavefront Coding complex phases are non-separable, and the sum of rectangularly separable forms. One non-separable form is defined as:

$$phase(r,\theta)=\exp(j^*\ [\Sigma r^{a_i}\cos(b_i\theta+\phi_i)])$$

where the sum is again over the subscript i. In general, there are an infinite number of different phase functions that can be used in Wavefront Coding Phase Contrast systems.

The ambiguity function shown in FIG. 6 for this Wavefront Coded system is seen to have optical power spread over a much larger region in the ambiguity domain than does the diffraction-limited system plotted in FIG. 5. Broader regions of optical power in the ambiguity function translate to larger depth of field or depth of focus since the ambiguity function is essentially a radial plot of misfocused MTFs with the angular dimension pertaining to misfocus.

Figure 7:
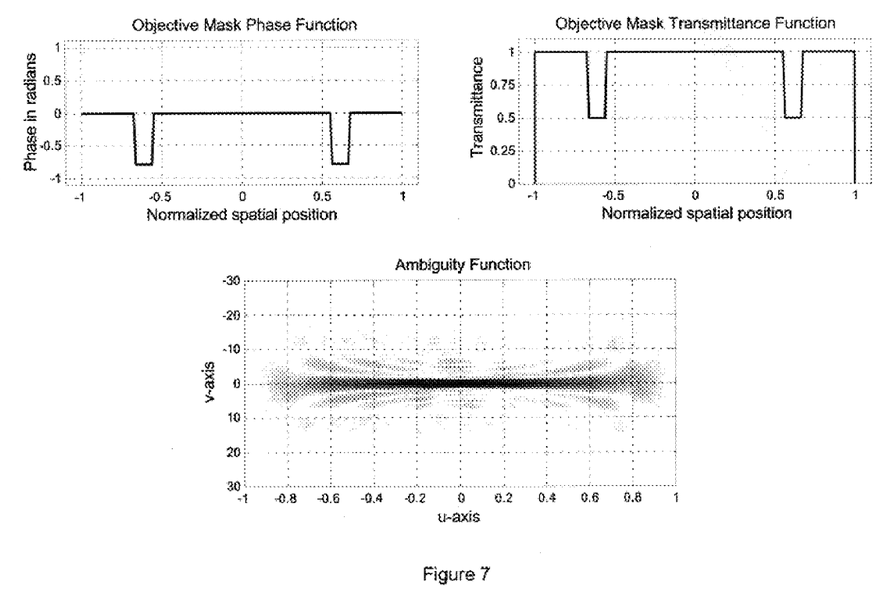
FIG. 7 includes plots showing the objective mask phase and transmittance functions and the corresponding ambiguity function for the Phase Contrast Imaging system of FIG. 1.

FIG. 7 shows the objective mask phase and transmittance functions and the corresponding ambiguity function for the prior art system of FIG. 1, including Phase Contrast masks 106a and 112b as shown in FIG. 2. Thus, these plots illustrate a system having Phase Contrast Imaging, but not Wavefront Coding. Again, a one-dimensional example is shown. The transmittance for this system, seen in the upper right plot, is 100% for the majority of the surface and 50% for the region that represents the annular region 206 of objective mask 112b. The phase variation of the objective is equal to zero over the majority of the surface, and −pi/2 for the region that represents the annular region 206 of objective mask 112b.

The corresponding ambiguity function for this phase contrast system in the lower plot of FIG. 7 is seen to differ from the diffraction-limited system represented in FIG. 5. The optical power near the v=0 axis is slightly broader then that of the diffraction-limited system, and much power is seen to be non-uniformly positioned off the v=0 axis as well. As the total volume under an ambiguity function is constant, any power away from the v=0 axis in effect lowers the power at other regions where it is desirable to have high power. The differences in this ambiguity function compared to that of FIG. 5 are due mainly from the −pi/2 phase steps in the objective mask phase function, and to a lesser extent, the transmittance reduction of the objective mask.

Figure 8:
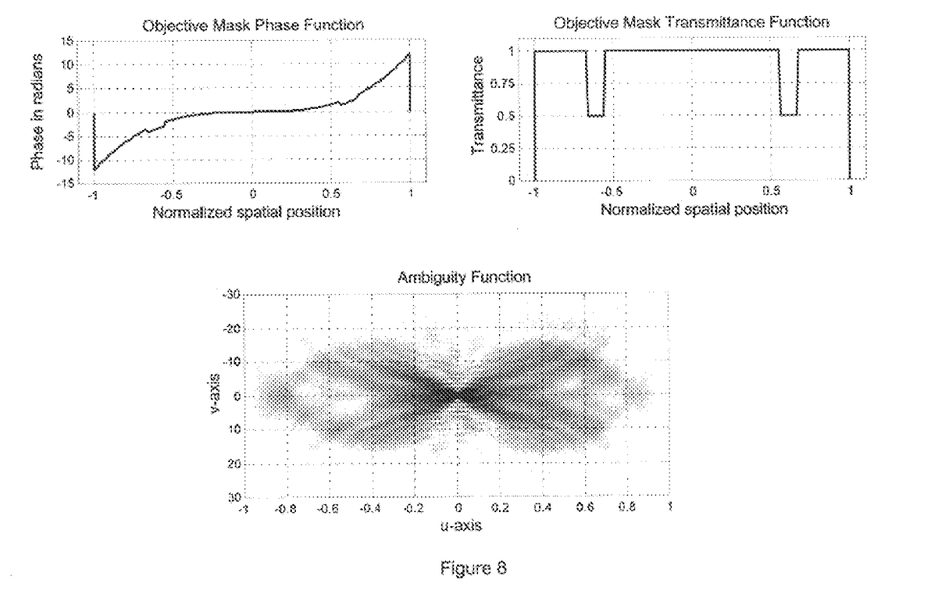
FIG. 8 includes plots showing the objective mask phase and transmittance functions and the corresponding ambiguity function for a configuration of the Wavefront Coding Phase Contrast Imaging system of FIG. 4.

FIG. 8 shows the objective mask and Wavefront Coding phase function and transmittance functions, and the ambiguity function for the improved system of FIG. 4, using Phase Contrast objective mask 112b as shown in FIG. 2. Thus, the Wavefront Coded Phase Contrast Imaging system is illustrated in FIG. 8. The phase function is seen to not be a simple binary function but a continually varying function with peak-to-valley phase changes of about +/−12 radians. The transmittance function is the same as shown in FIG. 7. The form of the objective mask phase profile, in radians, of this system is given by:

Phase profile$(x)=12x^3-(pi/2)[U((x-0.6)*10)+U((x+0.6)*10)$ ], $|x|<=1$

Where $U(z) = 1$ for $|z| < 1$
$= 0$ otherwise

The system's ambiguity function is seen to have more optical power uniformly spread about the horizontal v=0 axis when compared to either the Phase Contrast system plotted in FIG. 7 or the diffraction limited system plotted in FIG. 5. Thus, the Wavefront Coded Phase Contrast system will have a larger depth of field than the general Phase Contrast system. Although not apparent from the prior art descriptions of Phase Contrast imaging, such as that shown in FIG. 3, the Wavefront Coding Phase Contrast imaging system delivers a large depth of field while also imaging Phase variations of the object into intensity variations of the image.

Figure 9:
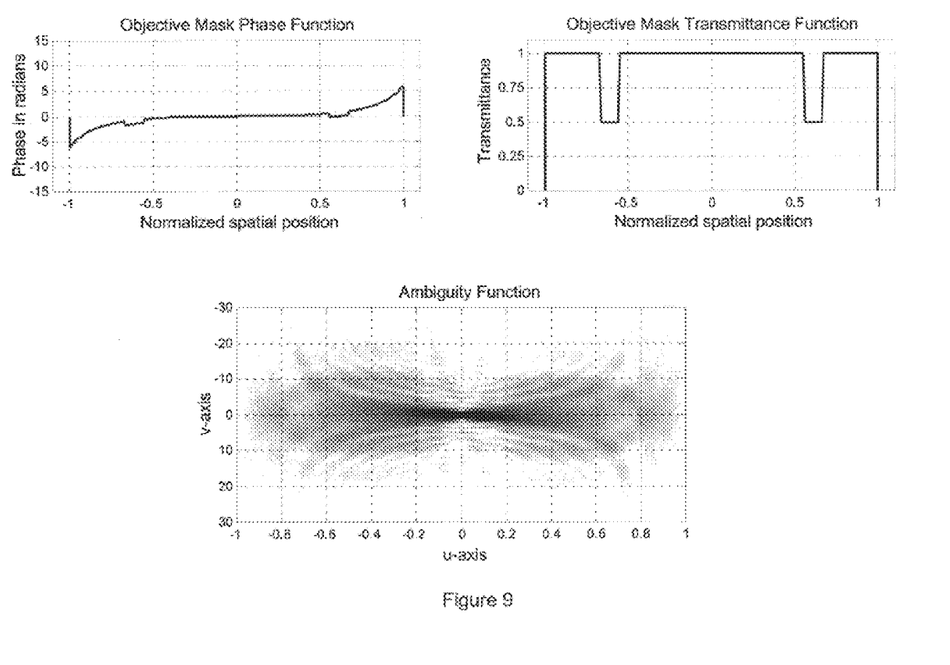
FIG. 9 includes plots showing the objective mask phase and transmittance functions and the corresponding ambiguity function for another configuration of the Wavefront Coding Phase Contrast imaging system of FIG. 4.

FIG. 9 shows another set of phase and transmittance functions and the ambiguity function for a further improved system of FIG. 4, using Phase Contrast objective masks 112b as shown in FIG. 2. The phase function is seen to be not a simple binary function but is a continually varying function with peak-to-valley phase changes of about +/−5 radians. This phase function is seen to be relatively close to zero over a larger portion of the center of the aperture than the phase function of FIG. 8. The transmittance function is the same as shown in FIG. 7. The phase profile of this system is given by:

Phase profile$(x)=3$ sign$(x)|x|^3+3$ sign$(x)|x|^{9.6}-(pi/2)[U((x-0.6)*10)+U((x+0.6)*10)+U((x+0.6)*10]$ for $|x| <= 1$, and where $U(z) = 1$ for $|z| < 1$
$= 0$ otherwise The Wavefront Coded system ambiguity function of FIG. 9 is seen to have a similar uniform arrangement of optical power about the v=0 axis as from FIG. 8. Thus, this Wavefront Coded Phase Contrast system will also have a larger depth of field than the general Phase Contrast system, while also imaging phase variations of the objects, as intensity variations in the image. Since this ambiguity function is more compactly represented about the v=0 axis than that of FIG. 8 it will yield higher MTFs over a range of misfocus than the system of FIG. 8 while also minimizing the effects of misfocus on the MTFs. As a consequence of higher MTFs, the size of the point spread functions (PSFs) (not shown) for the system of FIG. 9 is less than the size of the PSFs for the system of FIG. 8. Smaller PSF size translates to less post processing required to produce the final images.

Figure 10:
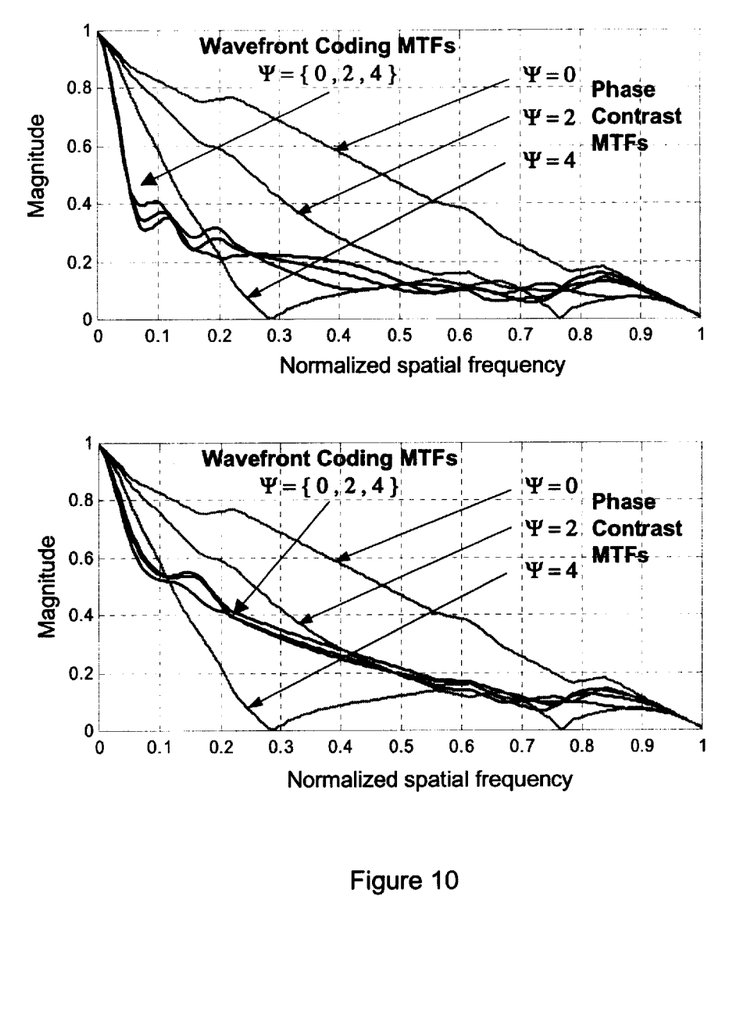
FIG. 10 includes plots showing MTFs as a function of misfocus for the prior art Phase Contrast system of FIG. 1, and MTFs as a function of misfocus for the Wavefront Coding Phase Contrast imaging system of FIG. 4, with the configurations of FIGS. 8 and 9.
Figure 11:
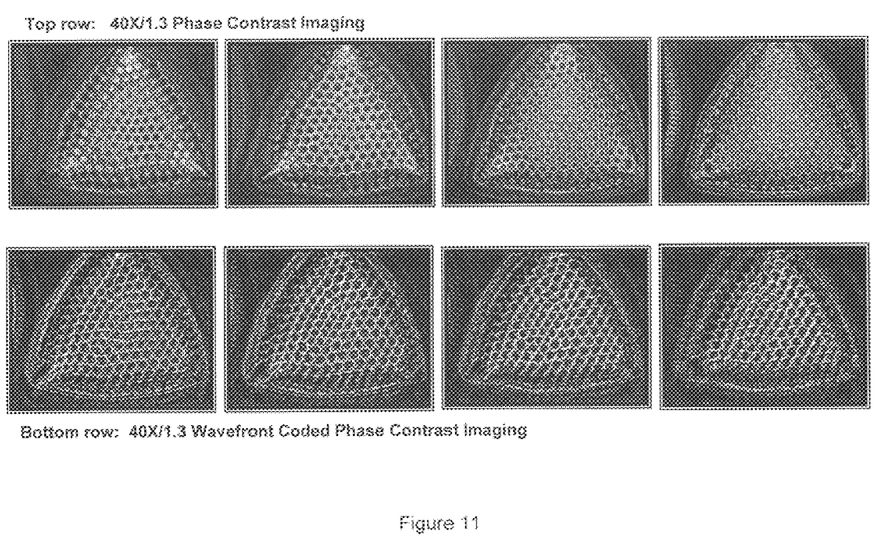
FIG. 11 is images of many planes of focus of a diatom imaged with a 40×, NA=1.3 objective, produced both by the traditional Phase Contrast Imaging system of FIG. 1, and the Wavefront Coding Phase Contrast Imaging system of FIG. 4.

The top plot of FIG. 10 shows the MTFs of the Phase Contrast imaging system (specifically the prior art system of FIG. 1, using Phase Contrast as in FIG. 2 with objective mask 112b), and the MTFs of the Wavefront Coded Phase Contrast system of FIG. 8. The bottom plot shows the MTFs of the Phase Contrast imaging system and the MTFs from the Wavefront Coding Phase Contrast imaging system of FIG. 9. These plots are the particular MTFs given in the respective ambiguity functions for the normalized misfocus values $\psi=\{0, 2, 4\}$. Notice that the MTFs for the Phase Contrast system (top and bottom plots) vary appreciably with even this slight amount of misfocus. The image will thus change drastically due to misfocus effects in the Phase Contrast system for only small, normalized misfocus values. This is expected from the ambiguity function associated with this system (shown in FIG. 7). By comparison, the MTFs from the Wavefront Coded Phase Contrast imaging systems (top and bottom plots) show very little change with misfocus as predicted by the ambiguity functions associated with these systems (shown in FIGS. 8 and 9). If the MTFs of the system do not change, the resulting MTFs (and hence also point spread functions) can be corrected over a large range of misfocus with a single post processing step 424. This is not possible with systems that do not have a large depth of field since the MTFs and PSFs representing the images change with misfocus to values that are unknown and often impossible in practice to calculate. The MTFs from the Wavefront Coded Phase Contrast system in the top plot are seen to have lower values for most spatial frequencies than the MTFs from the Wavefront Coded Phase Contrast system of the bottom plot. This is expected from the ambiguity functions of FIGS. 8 and 9 respectively. The more sophisticated two-term phase function yields MTFs that not only have similarly small change with misfocus but also give a higher MTF. This higher MTF results in a more compact PSF (not shown) as well as less signal-to-noise ratio penalties needed for the image processing 424.

In essence, the image processing function 424 restores the Wavefront Coding Phase Contrast transfer functions to those expected from the traditional Phase Contrast system with no misfocus. Since all the Wavefront Coding MTFs from a given system are essentially identical, after image processing 424 all MTFs (and hence all PSFs) will be nearly identical for each value of misfocus. The image processing function, though, is dependent on the type of phase function used. For example, the phase functions in FIGS. 8 and 9 are different from each other and correspond to ambiguity functions and MTFs that are also different from each other. The corresponding image processing functions for the two systems represented by FIGS. 8 and 9 are then also different from each other.

Notice that the MTFs from the Wavefront Coding Phase Contrast system of FIG. 4 (upper and lower plots of FIG. 10) essentially do not change with misfocus but also do not have the same shape as that of the in-focus MTF ($\psi=0$) of the Phase Contrast system. In the spatial domain, the Wavefront Coding Phase Contrast systems form images with a specialized blur where the blur is insensitive to the amount of misfocus or the presence of other focus related aberrations. The Image Processing function 424 of FIG. 4 is used to remove this blur. The Image Processing function is designed such that the MTFs and PSFs of the Wavefront Coding Phase Contrast system, over a range of misfocus, after processing closely match that of the in-focus Phase Contrast system. The Image Processing function can also produce an effective MTF after processing that has more or less contrast than the in-focus Phase Contrast system depending on the needs of the particular application.

More specifically, the image processing function, say F, implements a transformation on the blurred Wavefront Coding Phase Contrast system image, say $H_{WFC}$, so that after processing the system has an ideal response designated $H_{ideal}$. Typically, the ideal response is chosen as the in-focus response of the general Phase Contrast system. If implemented as a linear filter, then F is (in the spatial frequency domain) equivalent to:

$$F(w)H_{WFC}(W)=H_{ideal}(W)$$

where w denotes a spatial frequency variable. If the ideal response is fixed, then changing the Wavefront Coding Phase Contrast system $H_{WFC}$ changes the image processing function F. The use of a different objective mask or Wavefront Coding phase function can cause a change in the image processing function. In practice, it is common to to be able to measure slight changes in the Wavefront Coding Phase Contrast imaging system as a function of misfocus. In this case, the image processing function F is chosen as a best fit between the measured data and the desired system after processing.

There are many linear and non-linear prior art techniques for removing known and unknown blur in images. Computationally effective techniques include rectangularly separable or multi-rank linear filtering. Rectangularly separable linear filtering involves a two step process where the set of one-dimensional columns are filtered with a one dimensional column filter and an intermediate image is formed. Filtering the set of one-dimensional rows of this intermediate image with a one-dimensional row filter produces the final image. Multi-rank filtering is essentially the parallel combination of more than one rectangularly separable filtering operation. A rank N, digital filter kernel can be implemented with rectangularly separable filtering by using N rectangularly separable filters in parallel.

The form of the processing (rectangularly separable, multi-rank, 2D kernel, etc.) is matched to that of the Wavefront Coding element. Rectangularly separable filtering requires a rectangularly separable Wavefront Coding element. The elements described in FIGS. 6, 8, and 9 are all rectangularly separable.

FIG. 11 is an image of a diatom taken with a conventional 40×, NA=1.3 Phase Contrast system similar to that of FIG. 1, and an image of the same diatom taken with a 40×, NA=1.3 Wavefront Coding Phase Contrast system similar to that of FIG. 4. The top set of images was produced by the conventional 40× Phase Contrast system. The bottom set of images was produced by the Wavefront Coding Phase Contrast system. Comparing the images from left to right, object distance was varied by 2 microns farther away from the objective for each image compared to the image on its left. The bottom row Wavefront Coded Phase Contrast images are the final images produced after image processing of the detected image. Rectangularly separable digital filtering was used. Notice the strong brighter and darker intensity variations verses the gray background (or phase shading) visible on the top row (40×/1.3 Phase Contrast) images. This is a characteristic of Phase Contrast imaging. Notice also that many parts of the Phase Contrast images are blurred due to misfocus effects. In particular, the image of the central region of the diatom changes drastically with changes in misfocus. The halo seen on the outer region of the diatom is a misfocus effect. The characteristic Phase Contrast shading and very large extended depth of field are both seen in the Wavefront Coding images. In fact, some objects that have too much change in depth to be in focus at any one focus position in a traditional Phase Contrast system will be entirely in focus in the Wavefront Coding Phase Contrast system of the present invention.

As shown in FIGS. 8, 9, 10, and 11, the Wavefront Coding Phase Contrast imaging system essentially removes the effects of misfocus on the final images. The Wavefront Coding Phase Contrast system will control the misfocus effects independent of the source of the misfocus. When increasing the depth of field, as shown in FIG. 11, the misfocus effects are produced by the object not being in the best focus position relative to the imaging optics. Misfocus effects can also be produced by non-ideal optics, temperature changes, mechanical positioning errors, and various other sources of optical aberrations. Controlling all of these misfocus effects (and not simply those related to object positioning) allows inexpensive systems to be produced that image with surprisingly high quality.

For example, if objective lens 410 of FIG. 4 has a noticeable amount of chromatic aberration, then misfocus effects will be produced as a function of illumination wavelength. The Wavefront Coding Phase Contrast system controls the chromatic aberration misfocus effects in conjunction with depth of field related object misfocus effects. Other optical aberrations that can similarly be controlled include petzval curvature, astigmatism, spherical aberration, temperature related misfocus, and fabrication or alignment related misfocus. Any aberration that can be theoretically or practically improved in prior art systems by changing the focus position can also be corrected and improved in Wavefront Coding Phase contrast systems.

The Wavefront Coded objective mask phase functions of FIGS. 8 and 9 describe two configurations of the specialized optics of Wavefront Coding. There are in general an infinite number of different Wavefront Coding phase functions (or Wavefront Coding optics) that can be used with any Wavefront Coding system. Different Wavefront Coding phase functions can be preferred for a variety of factors. Examples of such factors include small changes of the corresponding MTFs with misfocus aberrations, corresponding MTFs with high values, corresponding compact PSFs, ease of required processing, or for ease of fabrication of the optical element itself.

The characteristics that practical Wavefront Coding mask phase functions have can generally be described as being relatively flat near the center of the aperture with increasing and decreasing phase near the ends or edges of the aperture. The central portion of the phase function controls the majority of the light rays that would not need modification if the objective were stopped down, for the particular amount of extended depth of field required. For increasing amounts of depth of field, the size of the central phase region that can ideally be flat decreases. Increasing the flatness of the central region of the rays leads to larger MTFs as seen in comparison to the phase functions and MTFs of FIGS. 8, 9, and 10. The edge portions of the phase function control the light rays that increase the light gathering and spatial resolution of the full aperture system, but that without modifications cause the largest amount of misfocus effects in traditional systems. It is these edge rays that should be the most modified by the objective mask phase function. It is also these edge rays that control the variation of the MTFs and PSFs with misfocus.

What is claimed is:

1. Apparatus for increasing depth of field and controlling focus related aberrations in a Phase Contrast Imaging system having an illumination source, illumination optics, and an illumination mask placed before a Phase Object to be imaged, and an objective mask and objective optics after the Phase Object to form an image at a detector, the improvement comprising:

an optical Wavefront Coding mask having an aperture and placed between the Phase Object and the detector, said coding mask being constructed and arranged to alter the optical transfer function of the Phase Contrast Imaging system in such a way that the altered optical transfer function is substantially insensitive to the distance between the Phase Object and the objective optics over a greater range of object distances than was provided by the unaltered optical transfer function, wherein the coding mask affects the alteration to the optical transfer function substantially by affecting the phase of light transmitted by the mask; and a post processing element for processing the image captured by the detector by reversing the alteration of the optical transfer function accomplished by the coding mask.

2. The apparatus of claim 1 wherein the detector is a charge coupled device (CCD).

3. The apparatus of claim 1, wherein the phase of light transmitted by the coding mask substantially follows a cubic function.

4. The apparatus of claim 1, wherein the phase of light transmitted by the coding mask is relatively flat near the center of the aperture with increasing and decreasing phase near respective ends of the aperture.

5. The apparatus of claim 4, wherein the phase of light transmitted by the coding mask is a smoothly varying function having peak to valley phase changes of about +5 radians to −5 radians.

6. The apparatus of claim 4, wherein the phase of light transmitted by the coding mask is a smoothly varying function having peak to valley phase changes of about +12 radians to −12 radians.

7. The apparatus of claim 4, wherein the phase of light transmitted by the coding mask substantially follows a sum of powers function of the form:

$$\text{phase}(x,y) = \exp(j^* [\Sigma a_i \, \text{sign}(x)|x|^{b}{}_i + c_i \text{sign}(y)|y|^{d}{}_i]),$$

where sum $\Sigma$ is over the subscript i; and
where $\text{sign}(x) = -1$ for $x<0$, $+1$ for $x \geq 0$, and $j = \sqrt{-1}$.

8. The apparatus of claim 1, wherein the phase of light transmitted by the coding mask substantially follows a non-separable function of the form:

$$\text{phase}(r,\theta) = \exp(j^* [\Sigma r^{a}{}_i \cos(b_i \theta + \phi_i)])$$

where sum $\Sigma$ is over the subscript l, and $j = \sqrt{-1}$.

9. The apparatus of claim 1, wherein the coding mask further comprises a lens element for focussing the light.

10. The apparatus of claim 1, wherein the coding mask is integrally formed with the objective mask.

11. The apparatus of claim 10, wherein the objective optics are further integrally formed with the coding mask and the objective mask.

12. The apparatus of claim 1, wherein the coding mask comprises an optical material having varying thickness.

13. The apparatus of claim 1, wherein the coding mask comprises an optical material having varying index of refraction.

14. The apparatus of claim 1, wherein the coding mask comprises spatial light modulators.

15. The apparatus of claim 1, wherein the coding mask comprises micro-mechanical mirrors.

16. The method for increasing depth of field and controlling focus related aberrations in a conventional Phase Contrast Imaging system having an illumination source, illumination optics, and an illumination mask placed before a Phase Object to be imaged, and an objective mask and objective optics after the Phase Object to form an image at a detector, the method comprising the steps of:

between the Phase Object and the detector, modifying the wavefront of transmitted light;

the wavefront modification step selected to alter the optical transfer function of the Phase Contrast Imaging system in such a way that the altered optical transfer function is substantially insensitive to the distance between the Phase Object and the objective optics over a greater range of object distances than was provided by the unaltered optical transfer function; and post processing the image captured by the detector by reversing the alteration of the optical transfer function accomplished by the mask.

17. The method of claim 16, wherein the phase of light transmitted by the mask substantially follows a cubic function.

18. The method of claim 16, wherein the modifying step modifies the phase of light transmitted according to a profile which is relatively flat near the center of the aperture with increasing and decreasing phase near respective ends of the aperture.

19. The method of claim 18, wherein the phase of light transmitted by the mask substantially follows a sum of powers function of the form:

$$\text{phase}(x,y) = \exp(j^*[\Sigma a_i \text{sign}(x)|x|^{b}{}_i + c_i \text{sign}(y)|y|^{d}{}_i]),$$

where sum $\Sigma$ is over the subscript i; and
where $\text{Sign}(x) = -1$ for $x<0$, $+1$ for $x \geq 0$.

20. The method of claim 16, wherein the phase of light transmitted by the mask substantially follows a non-separable function of the form:

$$\text{phase}(r,\theta) = \exp(j^*[\Sigma r^{a}{}_i \cos(b_i \theta + \phi_i)])$$

where sum $\Sigma$ is over the subscript i.

21. A Wavefront Coding Phase Contrast Imaging system for imaging a Phase Object comprising:
an illumination source;
illumination optics placed between the illumination source and the Phase Object;
an illumination mask placed between the illumination source and the Phase Object;
a detector;
an objective mask placed between the Phase Object and the detector;
objective optics placed between the Phase Object and the detector to form an image at the detector;
an optical Wavefront Coding mask having an aperture and placed between the Phase Object and the detector,
said mask being constructed and arranged to alter the optical transfer function of the Imaging system in such a way that the altered optical transfer function is substantially insensitive to the distance between the Phase Object and the objective optics over a greater range of object distances than was provided by the unaltered Imaging system optical transfer function,
wherein the mask affects the alteration to the optical transfer function substantially by affecting the phase of light transmitted by the mask; and
a post processing element for processing the image captured by the detector by reversing the alteration of the optical transfer function accomplished by the mask.

22. The apparatus of claim 21, wherein the phase of light transmitted by the coding mask is relatively flat near the center of the aperture with increasing and decreasing phase near respective ends of the aperture.

* * * * *

UNITED STATES PATENT AND TRADEMARK OFFICE
CERTIFICATE OF CORRECTION

PATENT NO.    : 6,525,302 B2
DATED         : February 25, 2003
INVENTOR(S)   : Dowski, Edward Raymond, Jr.

It is certified that error appears in the above-identified patent and that said Letters Patent is hereby corrected as shown below:

Column 9,
Lines 38-44, should read as follows:
-- Phase profile $(\chi) = 3 \text{ sign}(\chi) |\chi|^3 + 3 \text{ sign}(\chi) |\chi|^{9.6} - (pi/2) [U((\chi-0.6)*10) + U((\chi+0.6)*10)]$ for $|\chi| <= 1$, and where $U(z) = 1$ for $|z| < 1$
     $= 0$ otherwise --

Signed and Sealed this

Twenty-eighth Day of September, 2004

JON W. DUDAS
*Director of the United States Patent and Trademark Office*